United States Patent [19]
Terrell et al.

[11] 3,934,816
[45] Jan. 27, 1976

[54] FLUID CONTROL VALVE

[75] Inventors: Melvin L. Terrell, Los Angeles; Paul F. Lange, Downey; James B. Doolittle, Burbank, all of Calif.

[73] Assignee: International Telephone & Telegraph Corporation, New York, N.Y.

[22] Filed: July 24, 1974

[21] Appl. No.: 491,215

[52] U.S. Cl. .................... 251/141; 251/30; 251/44; 335/229
[51] Int. Cl.² ........................................ F16K 31/02
[58] Field of Search ......... 251/25, 30, 44, 129, 141; 137/596.16, 625.61, 625.64, 82, 83; 335/229, 230; 64/15 B, 27 B

[56] References Cited
UNITED STATES PATENTS

| | | | |
|---|---|---|---|
| 2,292,477 | 8/1942 | Ray | 251/30 |
| 2,760,509 | 8/1956 | Side | 137/82 |
| 2,774,564 | 12/1956 | Biggle | 251/30 |
| 2,905,871 | 9/1959 | Martin | 335/229 |
| 3,090,592 | 5/1963 | Fleer | 251/30 |
| 3,140,727 | 7/1964 | Cutler | 251/30 |
| 3,357,676 | 12/1967 | Boonshaft | 251/30 |
| 3,366,132 | 1/1968 | Fore | 137/625.64 |
| 3,457,956 | 7/1969 | Andrews | 251/30 |
| 3,498,308 | 3/1970 | Miller, Jr. et al. | 137/625.64 |
| 3,677,826 | 7/1972 | Pointout et al. | 251/30 |
| 3,714,610 | 1/1973 | Duff et al. | 335/229 |
| 3,794,868 | 2/1974 | Haigh | 251/65 |
| 3,796,229 | 3/1974 | Wright | 251/30 |

*Primary Examiner*—Martin P. Schwadron
*Assistant Examiner*—George L. Walton
*Attorney, Agent, or Firm*—T. L. Peterson

[57] ABSTRACT

An electromagnetically operated fluid control valve having an armature mounted within the valve housing and a coil assembly mounted outside of the housing. Actuation of the coil assembly causes the armature to shift away from a valve port, thereby allowing fluid flow through the port. The armature is mounted on the housing by means of a torsion bar which permits fluid flow to be proportional to the input signal to the coil assembly and minimizes hysteresis. The coil assembly includes a permanent magnet and also a pair of pole pieces. Pole extensions are sealed in the housing wall in alignment with the pole pieces and adjacent to the armature. Thus, the coil assembly is not subject to corrosion or contamination from fluid passing through the valve.

5 Claims, 4 Drawing Figures

FLUID CONTROL VALVE

BACKGROUND OF THE INVENTION

This invention relates generally to a fluid control valve and, more particularly, to an electromagnetically operated fluid control valve.

Electromagnetic actuators are commonly utilized for operating fluid control valves. Such an actuator is typically mounted within the valve housing and is often in direct fluid flow communication with the interior thereof so that it is subjected to contamination and corrosion caused by some fluids, such as steam, passing through the valve.

Another problem encountered with electromagnetically operated fluid control valves is that when the armature of the magnetic control assembly is utilized as a flapper valve element for closing a port, the valve suffers non-linearity. That is, the rate of flow of fluid through the valve is not proportional to the input signal to the magnetic control device. Hysteresis is also a problem and results from mechanical energy being degraded to heat energy and is indicated by the failure of the armature to return to its original position when the input signal is reduced to a previous value. Such problems ococur, for example, when the armature is pivotally connected to the valve housing by sheet metal strips.

The purpose of the present invention is to minimize the foregoing problems in prior art electromagnetically operated fluid control valves.

SUMMARY OF THE INVENTION

According to a principal aspect of the present invention, there is provided an electromagnetically operated fluid control valve comprising a housing having a valve port and magnetically attractable armature therein adjacent to the port. A magnetic control assembly including a coil and a pair of pole pieces is mounted on the outside of the valve housing. A pair of separate pole extensions are sealed in the wall of the housing in alignment with the pole pieces. The armature in the housing is disposed adjacent to the pole extensions so as to be within the range of magnetic influence of the magnetic control assembly. Actuation of the magnetic control assembly shifts the armature in a direction opening the valve port thereby allowing flow of fluid through the port. Thus, by this arrangement the magnetic control assembly is mounted remotely from the fluid flow path through the valve so that it will not be subjected to corrosion or contamination resulting from the fluid passing through the valve. The magnetic control assembly may also be conveniently replaced when required.

According to another aspect of the invention, the armature of the valve is attached to the housing by means of a torsion bar. We have found that by use of a torsion bar pivotal mounting arrangement for the armature, the rate of flow of fluid through the valve is essentially proportional to the input signal to the magnetic control assembly and hysteresis problems are minimized.

DESCRIPTION OF THE PREFERRED EMBODIMENTS

Figure 1:
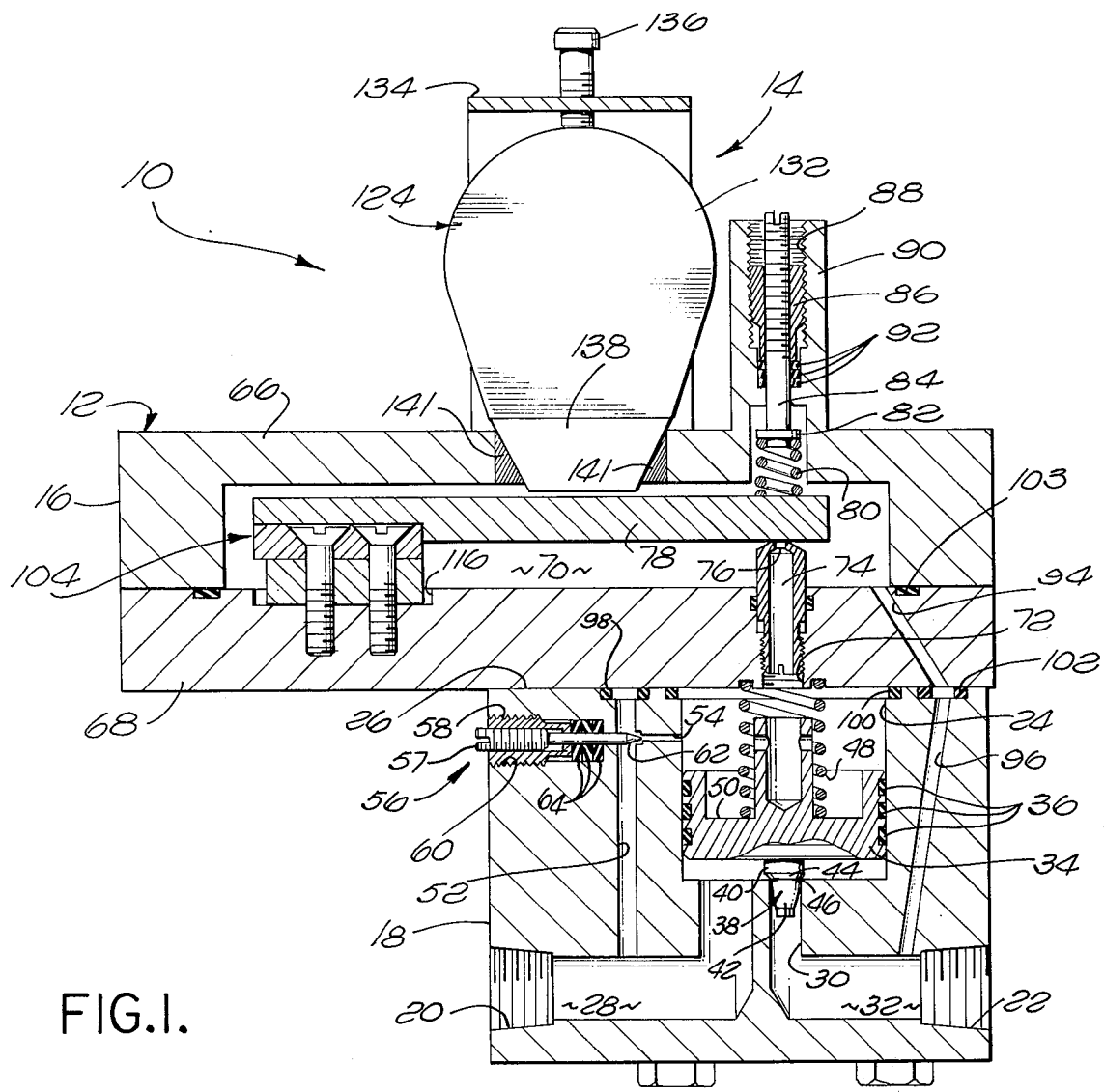
FIG. 1 is a longitudinal sectional view through the control valve of the present invention.
Figure 2:
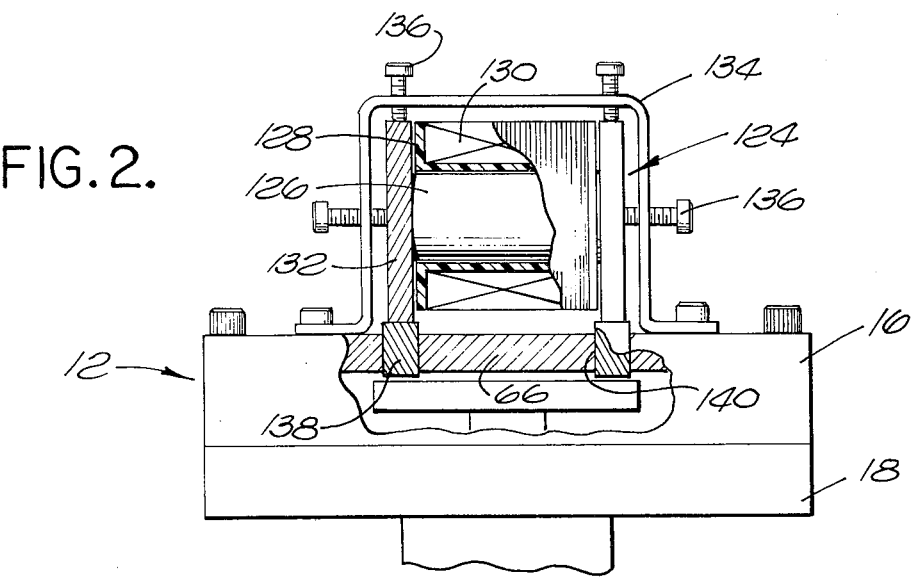
FIG. 2 is an end view of the control valve illustrated in FIG. 1, in partial vertical section.
Figure 3:
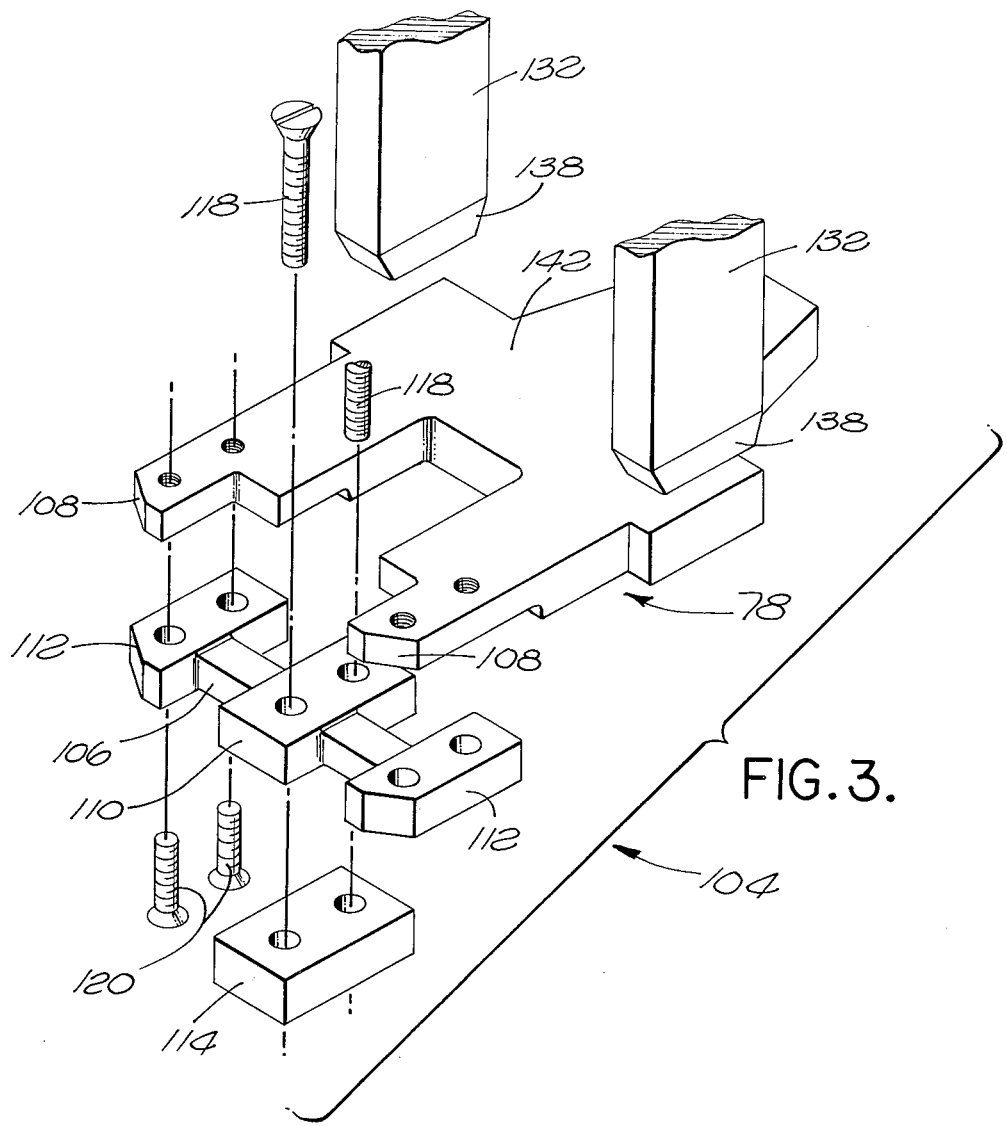
FIG. 3 is an exploded perspective view of the armature, the torsion bar mounting arrangement therefor and the pole pieces utilized in the valve illustrated in FIGS. 1 and 2.

Referring now to FIGS. 1–3 in detail, there is illustrated the electromagnetically operated fluid control valve of the present invention, generally designated 10. The valve comprises a valve housing 12 and magnetic control means for the valve, generally designated 14. The valve housing includes an upper part 16 and a lower part 18.

The lower part 18 of the housing has an inlet port 20 and an outlet port 22. A cylindrical chamber 24 opens at the upper surface 26 of the lower part of the housing. A passage 28 connects the inlet port 20 to the lower end of the chamber 24 offset from the center axis of the chamber. A main valve port 30 extends downwardly from the wall of the chamber 24 in axial alignment therewith. A passage 32 connects the port 30 to the outlet port 22. A piston 34 is vertically slidable in the chamber 24. Three annular seals 36 are mounted in grooves in the outer surface of the piston. The piston embodies a central downwardly extending extension 38 which extends into the main valve port 30. The extension includes an upper cylindrical section 40, a tapered lower plug section 42 and a transitional tapered section 44 therebetween. The bottom surface of the chamber 24 surrounding the main valve port 30 provides a valve seat 46. A coil spring 48 positioned between the upper part 16 of the housing and an annular upper surface 50 of the piston urges the piston downwardly causing the tapered transitional section 44 of the extension 38 on the piston to engage the seat 46, thereby closing the port 30. The structure described so far in the lower part 18 of the valve housing constitutes the main valve portion of the valve assembly.

A pilot valve is utilized for controlling the position of the piston and thereby the flow of fluid through the main valve. The pilot valve flow passages include a vertical bore 52 and a horizontal bore 54 which connects the bore 52 to the upper portion of the chamber 24 above the piston 34. A needle valve, generally designated 56, controls fluid flow from the passage 28 to the chamber 24 via the passages 52 and 54. The needle valve constitutes a valve stem 57 threaded into a packing nut 58 which in turn is threaded into a bore 60 in the side of the lower part 18 of the housing. The tapered end 62 of the stem 57 extends into the bore 54 for controlling fluid flow therethrough. Sealing rings 64 are mounted in the bottom of the bore 60. The rings 64 are compressed into sealing engagement around the stem 57 by the packing nut 58. The position of the needle valve end 62 may be altered by threading or unthreading the stem 57 in the packing nut.

The upper part 16 of the valve housing includes an upper wall 66 and a lower wall 68. The upper wall is formed with a downwardly facing recess defining a cavity 70. A vertical bore 72 extends through the lower wall 68 of the upper part 16 of the housing coaxial with the axis of the piston 34 to provide flow communication between the chamber 24 and the cavity 70. A hollow pilot valve member 74 is threaded into the opening 72. The member 74 extends above the upper surface of the lower wall 68 and terminates in a pilot valve port 76. A flapper valve member 78, which is the armature of the magnetic control assembly of the valve to be described in detail later, is biased into engagement with upper end of the valve member 74 to close the pilot valve port 76 by means of a spring 80. The bottom of the spring 80 engages the upper surface of the armature 78. The upper end of the spring seats against a flange 82 on a stem 84 which is threaded into a packing nut 86. The packing nut is threaded into a bore 88 formed in a boss 90 extending upwardly from the upper wall 66 of the housing. Sealing rings 92 are positioned in the bottom of the bore 88. Threading or unthreading of the stem 84 in the packing nut 86 permits adjustment to be made in the force of the spring 80 acting up the upper surface of the armature 78.

A passage 94 extending through the lower wall 68 of the upper port 16 of the housing communicates with a passage 96 in the lower part of the housing. The passage 96 opens into the passage 32 so that the passages 94, 96 provide flow communication between the cavity 70 in the upper part of the housing and the outlet port 22 of the main valve. Preferably sealing rings 98, 100 and 102 are provided between the upper surface of the lower part 18 and the lower surface of the upper part 16 of the housing to provide seals for the passage 52, chamber 24 and passages 94 and 96, respectively. Also, a sealing ring 103 is provided between lower wall 68 and upper wall 66 of the valve housing.

In accordance with one feature of the invention, the armature 78 is connected to the lower wall 68 of the housing by a torsion bar assembly, generally designated 104. This assembly comprises an elongated torsion bar 106 which extends laterally with respect to a pair of spaced apart legs 108 formed on the rear portion of the armature 78. The assembly 104 also includes an intermediate mounting portion 110 and a pair of end mounting portions 112. A spacer block 114 underlies the intermediate mounting portion 110. The block is mounted within a recess 116 in the upper surface of the lower wall 68. Screws 118 extend downwardly through the intermediate mounting portion 110 and spacer block 114 to secure the torsion bar assembly 104 to the valve housing. Additional screws 120 extend upwardly through the end mounting portions 112 of the torsion bar assembly and the ends of the legs 108 of the armature to connect the armature to the torsion bar assembly. The bar 106 is capable of torsion flexure thereby allowing the free end of the armature 78 to rotate about the torsion bar in response to magnetic flux applied thereto.

Preferably the armature is formed of magnetic grade stainless steel such as 430 or 430F when the valve assembly of the present invention is utilized for controlling the flow of steam, for example. Other magnetic materials with suitable plating for protection from corrosion could also be utilized. Further, if the fluid being controlled is not corrosive in nature, standard magnetic steel materials could be utilized. The spacer 114, screws 118 and torsion bar assembly 104 may be formed of either a magnetic or nonmagnetic metal. The valve housing is formed of non-magnetic material. All metallic parts which come into contact with the fluid being controlled must be suitably resistant to or protected bby plating from corrosion.

The magnetic control assembly 14 of the valve 10 includes a coil assembly, generally designated 124. The coil assembly comprises a permanent magnet core 126 surrounded by a non-magnetic coil form 128, formed of nylon, for example, which carries a coil 130. The coil is connected to a controllable d.c. input signal source, not shown. Pole pieces 132 are mounted on opposite ends of the permanent magnet 126 in contact therewith. The coil assembly is mounted on the outside of the valve housing 12 by means of a non-magnetic frame 134 carrying a plurality of screws 136 which hold the assembly 124 in place. By unthreading the screws 136, the coil assembly 124 may be removed for repair or replacement. Obviously, other mounting arrangements could be used allowing for removal and replacement of the coil assembly.

Separate pole piece extensions 138 extend through openings 140 in the upper wall 66 of the housing in alignment with the pole pieces 132. The pole extensions are sealed in the wall 66 by being brazed or welded therein, as indicated at 141 in FIG. 1. Alternatively, the extensions 138 could be cast into the housing wall. The lower ends of the pole pieces engage the extensions 138. The middle portion 142 of the armature is positioned in close proximity to the inner ends of the pole piece extensions 140 so as to be within the range of magnetic influence of the coil assembly 124. By this arrangement, it will be appreciated that the coil assembly is mounted outside of the housing remote from the path of flow of fluid through the cavity 70 so that the coil assembly will not be subjected to corrosion or contamination by the fluid. This arrangement also allows the coil assembly to be readily removed from the valve housing.

The torsion bar 106 acts as a very nearly linear spring having very little hysteresis. The torque of the torsion bar plus the torque resulting from the force of the adjusting spring 80 is opposed by the torque resulting from the magnetic forcese of the coil assembly such that the resultant small differential force causes theh armature to deflect upwardly so that the rate of fluid flow through the valve varies nearly proportionally to the input signal to the coil.

The permanent magnet is utilized as the core of the coil assembly so that only a low voltage need be applied to the coil to effect movement of the relatively heavy armature. The permanent magnet core 126 could be replaced by a less expensive soft iron core but a higher input signal would be required for the coil to shift the armature.

The operation of the valve of the present invention is as follows. The pilot valve port 76 is normally closed by the armature 78 under the influence of the spring 80. When fluid is introduced into the inlet port 20, fluid pressure will act on the bottom of the piston tending to lift the piston and, hence, the valve element 38 off the port 30. Some of the fluid, however, will also flow through the passages 52, 54 into the chamber 24 above the piston. The needle valve 56 is positioned to balance the pressure on opposite sides of the piston. Thus, the spring 48 will normally hold the piston in its closed position. When it is desired to open the main valve, the coil 130 is energized causing the armature 78 to lift off of the valve member 74 thereby opening the pilot port 76. Fluid pressure in the chamber 24 above the piston will then be reduced due to the connection of the pilot port with the outlet port 22 of the valve via the cavity 70 and passages 94 and 96. Because the pressure above the piston is reduced, the piston will rise thereby lifting the valve member 38 off the seat 46 of the main valve, providing flow of fluid from the passage 28 through the main valve port 30 to the outlet port 22. To stop the flow of fluid through the main valve, the coil 130 is de-energized so that the armature 78 will close the pilot port 76.

We have found that due to the torsion bar mounting arrangement for the armature 78, the valve of the present invention does not suffer from the problems of non-linearity and hysteresis. This is desirable when the valve is utilized for metering controlled volumes of fluid to a utilization means coupled to the outlet port 22 of the valve. Such utilization means, not shown, may be a turbine generator, in which case the valve is utilized for metering the flow of steam to the generator. The valve could also be used for metering liquids, such as fuel, to an internal combustion engine, for example.

A illustrated, the valve of the present invention is designed so that the input signal to the coil 130 causes an increase in magnetic attraction to open the pilot port 76. If desired, the pilot port could be mounted above the armature 78 together with the spring 80 and movement of the armature could be effected by reducing the voltage applied to the coil 130, thereby causing a decrease in magnetic attraction. In this case, the spring would tend to shift the armature away from the pilot port. In addition, the piston 34 could be replaced by a diaphragm and the valve element 38 could be in the form of a flat plate engaging the valve seat 46 rather than in the form of a plug as illustrated in FIG. 1.

Figure 4:
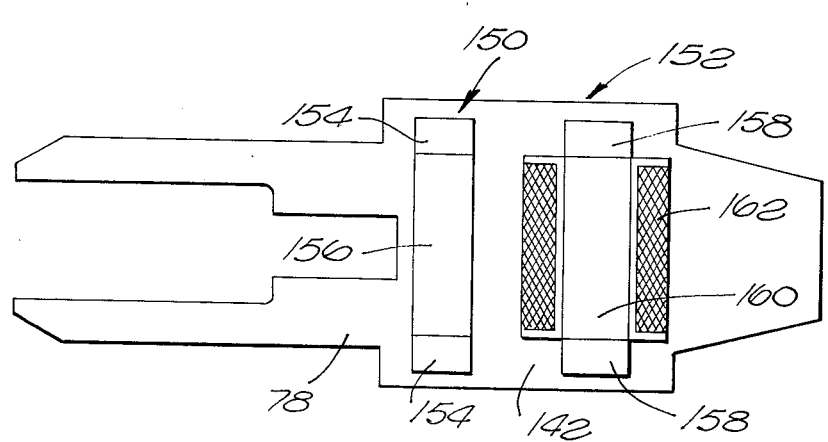
FIG. 4 is a somewhat schematic top plan view of the armature with a pair of magnetic control assemblies associated therewith in accordance with an alternative embodiment of the invention.

The use of a permanent magnet, such as Alnico 5, increases the cost of the magnetic control assembly 14, although it has the advantage of allowing the use of a relatively smaller input signal to the coil for actuating the a armature. Such cost could be reduced by utilizing a parallel magnetic circuit, as illustrated schematically in FIG. 4. As seen in FIG. 4, there is provided a pair of magnetic control devices 150 and 152 overlying the middle section 142 of the armature 78. The device 150 comprises a pair of pole pieces 154 mounted adjacent to opposite ends of a relatively small permanent magnet 156. That is, the permanent magnet 156 is substantially smaller than the permanent magnet 126 utilized in the embodiment illustrated in FIGS. 1–3. Therefore, it is substantially less expensive. No coil surrounds the magnet 156. The second magnetic device 152 includes a pair of pole pieces 158 at opposite ends of an inexpensive soft iron core 160 which is surrounded by a control coil 162. Energization of the coil 162 causes movement of the armature 78 in the same manner as that described previously in connection with the embodiment illustrated in FIGS. 1–3.

What is claimed is:

1. An electromagnetically operated control valve comprising: a housing having a valve port and a magnetically attractable armature therein adjacent to said port, said housing having an inlet and an outlet, but being otherwise sealed; magnetic control means on said housing including a core assembly having a pair of pole pieces, said armature being disposed within the range of magnetic influence of said control means, actuation of said control means shifting said armature in directions toward and away from said valve port to control fluid flow therethrough, means mounting said coil assembly outside of said housing adjacent to a wall thereof; and a pair of pole extensions sealed in said wall in alignment with said pole pieces, said armature being disposed adjacent to said pole extensions.

2. An electromagnetically operated fluid control valve comprising: a valve housing having an inlet port and an outlet port but otherwise sealed; a flow passage between said ports; a valve port in said passage; closure means for selectively closing said valve port; said closure means including a magnetically attractable armature movable in said housing; and magnetic control means on said housing, said armature being disposed within the range of magnetic influence of said control means, actuation of said control means shifting said armature and said closure means, said armature including a pair of spaced legs thereon; said torsion bar means comprising an elongated bar extending laterally with respect to said armature adjacent to said legs; said bar having enlarged end mounting portions and an enlarged intermediate mounting portion; means fixedly connecting said intermediate mounting portion to said housing; and means fixedly connecting said end mounting portions to said legs.

3. An electromagnetically operated fluid control valve comprising: a valve housing have an inlet port and an outlet port but otherwise sealed; a flow passage between said ports; a valve port in said passage; closure means for selectively closing said valve port; said closure means including a magnetically attractable armature movable in said housing; and magnetic control means on said housing, said armature being disposed within the range of magnetic influence of said control means, actuation of said control means shifting said armature and said closure means, said magnetic control means including a coil assembly having a pair of pole pieces; means mounting said coil assembly outside of said valve housing remote from the flow of fluid through said flow passage; and a pair of pole extensions separate from said pole pieces sealed in the wall of said valve housing in alignment with said pole pieces, said extensions extending from said pole pieces through said wall to the interior of said housing in close proximity to said armature.

4. A control valve as set forth in claim 3 wherein: said coil assembly comprises a coil surrounding but spaced from a permanent magnet core; and said pole pieces contact the opposite ends of said core.

5. An electromagnetically operated fluid control valve comprising: a valve housing having an inlet port and an outlet port but otherwise sealed; a flow passage between said ports; a valve port in said passage; closure means for selectively closing said valve port; said closure means including a magnetically attractable armature movable in said housing; and magnetic control means on said housing, said armature being disposed within the range of magnetic influence of said control means, actuation of said control means shifting said armature and said closure means, said magnetic control means comprising first and second magnetic assemblies; said first magnetic assembly comprising a pair of pole pieces, each said pole piece having a first end and a second end, a permanent magnet extending between said first ends of said pole pieces, said second ends of said pole pieces being adjacent to said armature, said first magnetic assembly being devoid of a coil surrounding said magnet; and said second magnetic assembly comprising a second pair of pole pieces, each said pole piece of said second pair having a first end and a second end, a soft iron core extending between said first ends of said pole pieces of said second pair, said second ends of said pole pieces of said second pair being adjacent to said armature, and a coil surrounding said core; said first-mentioned and second pairs of pole pieces being mounted in adjacent parallel relationship.

* * * * *